(12) United States Patent
Choi et al.

(10) Patent No.: US 10,056,168 B2
(45) Date of Patent: *Aug. 21, 2018

(54) ELECTRICALLY CONDUCTIVE POLYAMIDE/POLYPHENYLENE ETHER RESIN COMPOSITION AND MOLDED ARTICLE FOR VEHICLE USING THE SAME

(71) Applicant: Lotte Advanced Materials Co., Ltd., Yeosu-si (KR)

(72) Inventors: Won Young Choi, Uiwang-si (KR); Doo Young Kim, Uiwang-si (KR); Won Ko, Uiwang-si (KR); Jung Hun Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,917

(22) Filed: Apr. 5, 2016

(65) Prior Publication Data

US 2016/0300639 A1    Oct. 13, 2016

(30) Foreign Application Priority Data

Apr. 10, 2015 (KR) .................. 10-2015-0050783
Feb. 16, 2016 (KR) .................. 10-2016-0018068

(51) Int. Cl.
*H01B 1/24* (2006.01)
*C08L 77/06* (2006.01)
*C08L 71/12* (2006.01)

(52) U.S. Cl.
CPC ............... *H01B 1/24* (2013.01); *C08L 71/12* (2013.01); *C08L 77/06* (2013.01)

(58) Field of Classification Search
None
See application file for complete search history.

(56) References Cited

U.S. PATENT DOCUMENTS

| | | | |
|---|---|---|---|
| 5,591,382 A | 1/1997 | Nahass et al. | |
| 5,643,502 A | 7/1997 | Nahass et al. | |
| 5,651,922 A | 7/1997 | Nahass et al. | |
| 5,741,846 A | 4/1998 | Lohmeijer et al. | |
| 5,843,340 A | 12/1998 | Silvi et al. | |
| 5,977,240 A | 11/1999 | Lohmeijer et al. | |
| 6,171,523 B1 | 1/2001 | Silvi et al. | |
| 6,221,283 B1* | 4/2001 | Dharmarajan | C08K 3/04 252/511 |
| 6,331,592 B1* | 12/2001 | Wong | C08F 255/00 525/179 |
| 6,352,654 B1 | 3/2002 | Silvi et al. | |
| 6,469,093 B1 | 10/2002 | Koevoets et al. | |
| 6,486,255 B2 | 11/2002 | Koevoets et al. | |
| 6,593,411 B2 | 7/2003 | Koevoets et al. | |
| 6,599,446 B1 | 7/2003 | Todt et al. | |
| 6,936,652 B2 | 8/2005 | van Bennekom et al. | |
| 7,022,776 B2 | 4/2006 | Bastiaens et al. | |
| 7,226,963 B2 | 6/2007 | Koevoets et al. | |
| 7,540,980 B2 | 6/2009 | Noda et al. | |
| 8,168,008 B2 | 5/2012 | Miyata et al. | |
| 8,168,088 B2 | 5/2012 | Vergelati et al. | |
| 2002/0009589 A1* | 1/2002 | Bang | B82Y 30/00 428/367 |
| 2003/0130406 A1 | 7/2003 | van Bennekom et al. | |
| 2006/0122310 A1 | 6/2006 | Matthijssen | |
| 2007/0235697 A1 | 10/2007 | Borade et al. | |
| 2007/0238832 A1 | 10/2007 | Borade et al. | |
| 2011/0165336 A1 | 7/2011 | Bradley et al. | |
| 2012/0214932 A1 | 8/2012 | Huh et al. | |

(Continued)

FOREIGN PATENT DOCUMENTS

DE      102009020090     * 11/2010
EP      0506386 A2       9/1992

(Continued)

OTHER PUBLICATIONS

Search Report in counterpart European Application No. 16164150.1 dated Jul. 26, 2016, pp. 1-7.
Campbell et al., "Poly(Phenylene Oxide)/Polyamide Blends via Reactive Extrusion", Polymer Engineering and Science, Mid-Sep. 1990, vol. 30, No. 17, pp, 1056-1062.
Communication including supplementary European Search Report in commonly owned European Application No. 14878240.2 dated Aug. 29, 2017, pp. 1-8.
Supplementary Search Report in commonly owned European Application No. 14883992.1 dated Jul. 24, 2017, pp. 1-11.
International Search Report in counterpart International Application No. PCT/KR2014/013024 dated Mar. 13, 2015, pp. 1-4.
Office Action in commonly owned Korean Application No. 10-2014-0002930 dated Jun. 1, 2016. pp. 1-6.
International Search Report in commonly owned International Application No. PCT/KR2014/004856 dated Nov. 24, 2014, pp. 1-4.
Third Party Submission in commonly owned U.S. Appl. No. 15/121,834, filed May 30, 2017, pp. 1-15.

(Continued)

*Primary Examiner* — Tanisha Diggs
(74) *Attorney, Agent, or Firm* — Additon, Hoggins & Pendleton, P.A.

(57) ABSTRACT

An electrically conductive polyamide/polyphenylene ether resin composition and a molded article for vehicles using the same. The resin composition includes a polyphenylene ether; a polyamide; an olefin-based polymer; an impact modifier; a compatibilizer; and carbon fibrils, wherein the polyphenylene ether and the impact modifier form domains, and the polyamide, the olefin-based polymer and the carbon fibrils form a matrix, the domains including about 90 vol % or more of domain particles having a particle diameter of about 0.1 µm to about 2.0 µm, and wherein the electrically conductive polyamide/polyphenylene ether resin composition has a surface resistance of about $10^8 \Omega/\square$ or less as measured on a specimen having a size of about 100 mm×about 100 mm×about 0.5 mm under conditions of about 23° C. and about 50% relative humidity (RH). The electrically conductive polyamide/polyphenylene ether resin composition and the molded article for vehicles using the same can exhibit good properties in terms of mechanical strength, heat resistance, impact resistance and electrical conductivity.

13 Claims, No Drawings

(56) References Cited

U.S. PATENT DOCUMENTS

| | | | | |
|---|---|---|---|---|
| 2015/0031834 A1* | 1/2015 | Kobayashi | ............. | C08L 77/02 |
| | | | | 525/58 |
| 2015/0361591 A1* | 12/2015 | Watanabe | ............. | D06M 13/11 |
| | | | | 523/435 |
| 2016/0326369 A1 | 11/2016 | Choi et al. | | |
| 2017/0066889 A1 | 3/2017 | Hong et al. | | |

FOREIGN PATENT DOCUMENTS

| | | | |
|---|---|---|---|
| EP | 0685527 A1 | 12/1995 | |
| EP | 3093853 A1 | 11/2016 | |
| EP | 3112402 A1 | 1/2017 | |
| JP | 02-201811 A | 8/1990 | |
| JP | 04-300956 A | 10/1992 | |
| JP | 08-508534 A | 9/1996 | |
| JP | 2756548 A | 3/1998 | |
| JP | 2756545 B2 | 5/1998 | |
| JP | 10-310695 A | 11/1998 | |
| JP | 2001-302911 A | 10/2001 | |
| JP | 2002-146205 | 5/2002 | |
| JP | 2002-544308 A | 12/2002 | |
| JP | M03-528941 A | 9/2003 | |
| JP | 2003-277607 A | 10/2003 | |
| JP | 2003-531944 A1 | 10/2003 | |
| JP | 2005-508425 A | 3/2005 | |
| JP | 2009-074043 A | 4/2009 | |
| JP | 2009-532547 A | 9/2009 | |
| JP | 2011-162753 A | 8/2011 | |
| KR | 10-2007-0073965 A | 7/2007 | |
| KR | 10-0792783 B1 | 1/2008 | |
| KR | 10-2008-0109806 A | 12/2008 | |
| KR | 10-2013-0113118 A | 10/2013 | |
| KR | 10-2015-0068752 | 6/2015 | |
| WO | WO 9914273 A1 * | 3/1999 | ............. C08L 25/06 |
| WO | 00/68299 | 11/2000 | |
| WO | 02/37507 A1 | 5/2002 | |
| WO | 03/40224 A1 | 5/2003 | |
| WO | 2005-026260 A1 | 3/2005 | |
| WO | 2015/105296 A1 | 7/2015 | |
| WO | 2015/129962 A1 | 9/2015 | |

OTHER PUBLICATIONS

Office Action in commonly owned U.S. Appl. No. 15/108,702 dated Jun. 29, 2017, pp. 1-19.
Office Action in counterpart European Application No. 16164150.1 dated May 26, 2017, pp. 1-4.
Office Action in counterpart Korean Application No. 10-2016-0018068 dated Nov. 11, 2017, pp. 1-8.
Non-Final Office Action in commonly owned U.S. Appl. No. 15/108,702 dated Apr. 11, 2018, pp. 1-8.
Office Action in commonly owned Japanese Application Serial No. 2016-572217 dated Mar. 20, 2018, pp. 1-4.

* cited by examiner

ELECTRICALLY CONDUCTIVE POLYAMIDE/POLYPHENYLENE ETHER RESIN COMPOSITION AND MOLDED ARTICLE FOR VEHICLE USING THE SAME

CROSS-REFERENCE TO RELATED APPLICATION

This application claims priority under 35 USC Section 119 to and the benefit of Korean Patent Application 10-2015-0050783, filed on Apr. 10, 2015, and Korean Patent Application 10-2016-0018068, filed on Feb. 16, 2016, the entire disclosure of each of which is incorporated herein by reference.

FIELD

The present invention relates to an electrically conductive polyamide/polyphenylene ether resin composition and a molded article for vehicles manufactured using the same.

BACKGROUND

Plastic materials can exhibit good properties in terms of being light weight and providing a degree of freedom in design and molding processability. Plastic materials accordingly can be broadly used in various fields such as daily supplies, automobiles, and electric and electronic materials, which require various functions and performances.

For example, polyphenylene ethers can have excellent electrical and mechanical properties and high thermal deflection temperature and thus can be used as engineering plastics in various fields. Polyphenylene ethers can be used in the form of blends, for example with high impact resistance polystyrenes, as useful industrial materials. Recently, a polyamide/polyphenylene ether alloy has been prepared by blending a polyamide resin, a polyphenylene ether resin, and a compatibilizer as a third component using reaction extrusion technology for compatibilization of non-compatible blends through a chemical process.

A polyamide/polyphenylene ether alloy can provide a balance of properties such as heat resistance, impact resistance and chemical resistance. Accordingly, polyamide/polyphenylene ether alloys can be used for exterior components of vehicles such as a hubcap, a junction box, and the like, and engine compartment components of vehicles.

Recently, there is a need for a plastic material for exterior components which allows on-line electrostatic plating such that electrostatic plating can be simultaneously performed on the plastic material and other metal components. An electrically conductive polyamide/polyphenylene ether alloy developed by General Electric allows simultaneous electrostatic plating with other metal components, can be used for vehicle fender components, and does not require separate plating so as to reduce manufacturing costs.

In order to impart electrical conductivity to the polyamide/polyphenylene ether alloy, electrically conductive fillers such as carbon fibers and carbon black can be added thereto. However, carbon fibers can cause deterioration in formability. Typical carbon black requires addition of large amounts thereof in order to achieve electrical conductivity for use in electrostatic plating, which can cause deterioration in impact resistance and formability.

In order to address the problem of deterioration in impact resistance and formability of the electrically conductive polyamide/polyphenylene ether alloy, nanoscale carbon fibers (carbon fibrils) or electrically conductive carbon black can be used. However, use of nanoscale carbon fibers or electrically conductive carbon black can cause deterioration in compatibility of the polyamide/polyphenylene ether alloy.

In order to solve the problem of deterioration in compatibility and to prepare a polyamide/polyphenylene ether alloy exhibiting excellent properties, it is important to secure efficient compatibilization between a polyphenylene ether, a polyamide, and a compatibilizer. In a typical method, in order to secure efficient compatibilization, first, the polyamide and the polyphenylene ether are compatibilized, followed by adding electrically conductive carbon black thereto.

However, this method is performed using special extrusion facilities including a plurality of side feeders and requires a particular sequence of adding the polyamide/polyphenylene ether alloys, the compatibilizer and other additives. Thus, this method is uneconomical due to expensive facility investment and has low productivity due to restriction on the sequence of adding raw materials.

Therefore, in order to solve the above problems, the inventors carried out studies to develop an electrically conductive polyamide/polyphenylene ether resin composition, which can maintain excellent inherent properties of the polyamide/polyphenylene ether alloy, is applicable to on-line electrostatic plating, and has improved properties and economic feasibility.

SUMMARY OF THE INVENTION

Embodiments of the present invention provide an electrically conductive polyamide/polyphenylene ether resin composition, which can exhibit good properties in terms of mechanical strength, heat resistance, impact resistance and electrical conductivity, and a molded article for vehicles manufactured using the same. The electrically conductive polyamide/polyphenylene ether resin composition can be used in electrostatic plating and can provide good productivity and economic feasibility using an electrically conductive master batch in the preparation thereof.

The electrically conductive polyamide/polyphenylene ether resin composition includes: a polyphenylene ether; a polyamide; an olefin-based polymer; an impact modifier; a compatibilizer; and carbon fibrils, wherein the polyphenylene ether and the impact modifier form domains, and the polyamide, the olefin-based polymer and the carbon fibrils form a matrix, the domains including about 90 vol % or more of domain particles having a particle diameter of about 0.1 μm to about 2.0 and wherein the electrically conductive polyamide/polyphenylene ether resin composition has a surface resistance of about $10^8 \Omega/\square$ or less as measured on a specimen having a size of about 100 mm×about 100 mm×about 0.5 mm under conditions of about 23° C. and about 50% relative humidity (RH).

In exemplary embodiments, the electrically conductive polyamide/polyphenylene ether resin composition may include about 100 parts by weight of a base resin including about 10% by weight (wt %) to about 65 wt % of the polyphenylene ether and about 35 wt % to about 90 wt % of the polyamide; about 1 to about 15 parts by weight of the olefin-based polymer; about 1 to about 15 parts by weight of the impact modifier; about 0.2 to about 10 parts by weight of the compatibilizer; and about 0.1 to about 5 parts by weight of the carbon fibrils.

In exemplary embodiments, the polyphenylene ether may include at least one of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, a copolymer of poly(2,6-dimethyl-1,4-phenylene) ether and poly(2,3,6-trimethyl-1,4-phenylene) ether, and/or a copolymer of poly(2,6-dimethyl-1,4-phenylene) ether and poly(2,3,6-triethyl-1,4-phenylene) ether.

In exemplary embodiments, the polyamide may include at least one of Polyamide 6, Polyamide 66, Polyamide 46, Polyamide 11, Polyamide 12, Polyamide 610, Polyamide 612, Polyamide 6/66, Polyamide 6/612, Polyamide MXD6, Polyamide 6/MXD6, Polyamide 66/MXD6, Polyamide 6T, Polyamide 6I, Polyamide 6/6T, Polyamide 6/6I, Polyamide 66/6T, Polyamide 66/6I, Polyamide 6/6T/6I, Polyamide 66/6T/6I, Polyamide 9T, Polyamide 9I, Polyamide 6/9T, Polyamide 6/9I, Polyamide 66/9T, Polyamide 6/12/9T, Polyamide 66/12/9T, Polyamide 6/12/9I, and/or Polyamide 66/12/6I.

In exemplary embodiments, the olefin-based polymer may include at least one of a high density polyethylene, a low density polyethylene, a linear low density polyethylene, a polypropylene, an ethylene-α-olefin copolymer, a modified high density polyethylene, a modified low density polyethylene, a modified linear low density polyethylene, a modified polypropylene, and/or a modified ethylene-α-olefin copolymer, which are obtained by modification of the above compounds with at least one compound of α,β-unsaturated dicarboxylic acids and/or α,β-unsaturated dicarboxylic acid derivatives.

In exemplary embodiments, the impact modifier may include at least one of a block copolymer composed of an aromatic vinyl compound and a conjugated diene compound, a hydrogenated block copolymer obtained by hydrogenation of the block copolymer composed of the aromatic vinyl compound and the conjugated diene compound, a modified block copolymer obtained by modification of the block copolymer with at least one compound of α,β-unsaturated dicarboxylic acids and/or α,β-unsaturated dicarboxylic acid derivatives, and/or a modified hydrogenated block copolymer obtained by modification of the hydrogenated block copolymer with at least one compound of α,β-unsaturated dicarboxylic acids and/or α,β-unsaturated dicarboxylic acid derivatives.

In exemplary embodiments, the compatibilizer may include at least one of maleic acid, maleic anhydride, maleic hydrazide, dichloro maleic anhydride, fumaric acid, citric acid, citric acid anhydride, malic acid, and/or agaric acid.

In exemplary embodiments, the carbon fibrils may have a pH of about 4 to about 8.

In exemplary embodiments, the carbon fibrils may include about 0.1 wt % to about 5 wt % of an aromatic compound having a molecular weight of about 120 g/mol to about 1,000 g/mol.

In exemplary embodiments, the electrically conductive polyamide/polyphenylene ether resin composition may be prepared by melt kneading a portion or the entirety of the polyamide and a portion or the entirety of the carbon fibrils with a portion or the entirety of at least one of the olefin-based polymer and the impact modifier to form an electrically conductive master batch, followed by adding and melt kneading remaining components not included in the electrically conductive master batch.

Other embodiments relate to a molded article for vehicles manufactured using the electrically conductive polyamide/polyphenylene ether resin composition set forth above.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

An electrically conductive polyamide/polyphenylene ether resin composition according to the present invention is a compatibilized blend including: (A) a base resin including (A-1) a polyphenylene ether and (A-2) a polyamide; (B) an olefin-based polymer; (C) an impact modifier; (D) a compatibilizer; and (E) carbon fibrils, in which a morphology composed of a matrix and a domain may be formed.

As used herein, the term matrix refers to a continuous phase surrounding dispersed phases and the term domain refers to a discontinuous phase dispersed in the matrix. The matrix and the domain may also be referred to as a continuous phase and a dispersed phase, respectively. As used herein, the term matrix may be interchangeably used with the term continuous phase, and the term domain may be interchangeably used with the term dispersed phase.

In addition, as used herein, the term compatibilized blends refer to compositions physically and/or chemically compatibilized with the compatibilizer. Compatibility means the degree of compatibilization. Thus, high compatibility means that a certain compound can be easily compatibilized and low compatibility means that a certain compound has difficulty in compatibilization.

(A) Base Resin

According to exemplary embodiments, the base resin may include the polyphenylene ether (A-1) and the polyamide (A-2). In the electrically conductive polyamide/polyphenylene ether resin composition, the polyphenylene ether may form domains and the polyamide may form a matrix.

(A-1) Polyphenylene Ether

According to exemplary embodiments, the polyphenylene ether may include at least one selected from the group consisting of a polyphenylene ether polymer, a mixture of the polyphenylene ether polymer and an aromatic vinyl polymer, a modified polyphenylene ether polymer obtained through reaction of the polyphenylene ether polymer with a reactive monomer, and combinations thereof.

Examples of the polyphenylene ether polymer may include without limitation poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, a copolymer of poly(2,6-dimethyl-1,4-phenylene) ether and poly(2,3,6-trimethyl-1,4-phenylene) ether, a copolymer of poly(2,6-dimethyl-1,4-phenylene) ether and poly(2,3,6-triethyl-1,4-phenylene) ether, and the like, and combinations thereof. For example, poly(2,6-dimethyl-1,4-phenylene) ether, or a copolymer of poly(2,6-dimethyl-1,4-phenylene) ether and poly(2,3,6-trimethyl-1,4-phenylene) ether may be used. In exemplary embodiments, poly(2,6-dimethyl-1,4-phenylene) ether may be used as the polyphenylene ether polymer.

In exemplary embodiments, the aromatic vinyl polymer may be obtained by polymerization of an aromatic vinyl monomer. Examples of the aromatic vinyl monomer include without limitation styrene, p-methylstyrene, α-methylstyrene, 4-n-propylstyrene, and the like, and combinations thereof. For example, an aromatic vinyl polymer obtained by polymerization of an aromatic vinyl monomer including at least one of styrene and α-methylstyrene may be used.

In exemplary embodiments, the reactive monomer is a compound including an unsaturated carboxylic acid or an anhydride group thereof, or a compound capable of being modified into the unsaturated carboxylic acid or the anhydride group thereof through reaction, and may form a modified polyphenylene ether polymer through reaction with the polyphenylene ether polymer. Examples of the reactive monomer may include without limitation citric acid, citric acid anhydride, maleic anhydride, maleic acid, itaconic anhydride, fumaric acid, (meth)acrylic acid, (meth)acrylic acid esters, and the like, and combinations thereof.

In exemplary embodiments, considering high operation temperature, the modified polyphenylene ether polymer reacted with the reactive monomer can be effectively produced through graft reaction in a melt kneaded state using a phosphite-based heat stabilizer, without being limited thereto.

In exemplary embodiments, the polyphenylene ether may have an intrinsic viscosity of about 0.2 dl/g to about 0.8 dl/g, for example, about 0.3 dl/g to about 0.6 dl/g, as measured in chloroform at 25° C. When the polyphenylene ether has an intrinsic viscosity within this range, the electrically conductive polyamide/polyphenylene ether resin composition can exhibit good properties in terms of heat resistance, mechanical strength, processability, and the like.

In exemplary embodiments, the base resin of the electrically conductive polyamide/polyphenylene ether resin composition may include the polyphenylene ether in an amount of about 10 wt % to about 65 wt %, for example, about 20 wt % to about 60 wt %, based on 100 wt % of the base resin. In some embodiments, the base resin of the electrically conductive polyamide/polyphenylene ether resin composition may include the polyphenylene ether in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments of the present invention, the polyphenylene ether may be present in an amount of from about any of the foregoing amounts to about any other of the foregoing amounts.

When the base resin includes the polyphenylene ether in an amount within the above range, the electrically conductive polyamide/polyphenylene ether resin composition can exhibit good properties in terms of mechanical strength, heat resistance, flexibility, chemical resistance, processability, and the like.

(A-2) Polyamide

According to exemplary embodiments, the polyamide may be a polymer obtained by polymerization using amino acids, lactams, diamines, and/or dicarboxylic acids as main monomer components. The polyamide may include a polyamide homopolymer and/or copolymer, which is derived from the main monomer components, alone or in the form of a mixture.

Examples of the main monomer components may include without limitation amino acids such as 6-aminocaproic acid, 11-aminoundecanoic acid, 12-aminododecanoic acid, and p-aminomethyl benzoic acid; lactams such as ε-caprolactam and w-laurolactam; aliphatic, alicyclic, and/or aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic, alicyclic, and/or aromatic dicarboxylic acids such as adipic acid, suberic acid, azelaic acid, sebacic acid, dodecanoic acid, terephthalic acid, isophthalic acid, 2-chloroterephthalic acid, 2-methylterephthalic acid, 5-methylisophthalic acid, 5-sodium sulfoisophthalic acid, 2,6-naphthalene dicarboxylic acid, hexahydroterephthalic acid, hexahydroisophthalic acid, and the like, and combinations thereof.

Examples of the polyamide may include without limitation Polyamide 6, Polyamide 66, Polyamide 46, Polyamide 11, Polyamide 12, Polyamide 610, Polyamide 612, Polyamide 6/66, Polyamide 6/612, Polyamide MXD6, Polyamide 6/MXD6, Polyamide 66/MXD6, Polyamide 6T, Polyamide 6I, Polyamide 6/6T, Polyamide 6/6I, Polyamide 66/6T, Polyamide 66/6I, Polyamide 6/6T/6I, Polyamide 66/6T/6I, Polyamide 9T, Polyamide 9I, Polyamide 6/9T, Polyamide 6/9I, Polyamide 66/9T, Polyamide 6/12/9T, Polyamide 66/12/9T, Polyamide 6/12/9I, Polyamide 66/12/6I, and the like, and combinations thereof.

In exemplary embodiments, the polyamide may have a melting point of about 220° C. to about 360° C., for example, about 230° C. to about 320° C., and as another example about 240° C. to about 300° C., and may have a relative viscosity of about 2 dl/g or more, for example, about 2 dl/g to about 4 dl/g, as measured at 25° C. after adding 1 wt % of the polyamide to m-cresol. Within this range, the electrically conductive polyamide/polyphenylene ether resin composition can exhibit good properties in terms of heat resistance, mechanical strength, compatibility, and the like.

In exemplary embodiments, the base resin of the electrically conductive polyamide/polyphenylene ether resin composition may include the polyamide in an amount of about 35 wt % to about 90 wt %, for example, about 40 wt % to about 80 wt %, based on 100 wt % of the base resin. In some embodiments, the base resin of the electrically conductive polyamide/polyphenylene ether resin composition may include the polyamide in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the polyamide may be present in an amount of from about any of the foregoing amounts to about any other of the foregoing amounts.

When the base resin includes the polyamide in an amount within the above range, the electrically conductive polyamide/polyphenylene ether resin composition can exhibit good properties in terms of mechanical strength, heat resistance, compatibility, and the like.

(B) Olefin-Based Polymer

The olefin-based polymer according to exemplary embodiments may include a (co)polymer obtained by polymerization of an olefin-based monomer, a copolymer obtained by polymerization of the olefin-based monomer and an acrylic monomer, a modified olefin-based polymer obtained by modification of the (co)polymer with a compound including at least one reactive group (for example a reactive group capable of reacting with the polyamide) such as at least one of α,β-unsaturated dicarboxylic acids and/or α,β-unsaturated dicarboxylic acid derivatives, and the like, and combinations thereof.

In exemplary embodiments, the olefin-based monomer may be a $C_1$ to $C_{19}$ alkylene, without being limited thereto.

Examples of the olefin-based monomer may include without limitation ethylene, propylene, isopropylene, butylene, isobutylene, octane, and the like, and these monomers may be used alone or as a mixture thereof.

In exemplary embodiments, the acrylic monomer may be an alkyl (meth)acrylic acid ester and/or (meth)acrylic acid. As used herein, the term "alkyl" means a $C_1$ to $C_{10}$ alkyl. Examples of the alkyl (meth)acrylic acid ester may include without limitation methyl (meth)acrylate, ethyl (meth)acrylate, propyl (meth)acrylate, butyl (meth)acrylate, and the like, and combinations thereof. For example, methyl (meth) acrylate may be used as the acrylic monomer.

In exemplary embodiments, a modified olefin-based polymer including a reactive group capable of reacting with the polyamide can achieve effective improvement in compatibility of the polyphenylene ether and the polyamide. Thus, a modified olefin-based polymer obtained by modification with a compound including the reactive group can be used in exemplary embodiments.

The modified olefin-based polymer may have a structure in which a compound including a reactive group such as α,β-unsaturated dicarboxylic acids and/or α,β-unsaturated dicarboxylic acid derivatives is grafted to a main chain composed of the olefin-based monomer and/or the copolymer of the olefin-based monomer and the acrylic monomer. Examples of the reactive group may include without limitation a maleic anhydride group, an epoxy group, and the like. Examples of the modified olefin-based polymer may include without limitation a maleic anhydride group-grafted maleic anhydride modified ethylene-α-olefin copolymer, maleic anhydride modified low density polyethylene, and the like, and combinations thereof.

In exemplary embodiments, the olefin-based polymer may include a high density polyethylene, a low density polyethylene, a linear low density polyethylene, a polypropylene, an ethylene-α-olefin copolymer, a modified high density polyethylene, a modified low density polyethylene, a modified linear low density polyethylene, a modified polypropylene, and/or a modified ethylene-α-olefin copolymer, which are obtained by modification of the above compounds with at least one compound of α,β-unsaturated dicarboxylic acids and/or α,β-unsaturated dicarboxylic acid derivatives, and the like, and combinations thereof.

In exemplary embodiments, the electrically conductive polyamide/polyphenylene ether resin composition may include the olefin-based polymer in an amount of about 1 to about 15 parts by weight, for example, about 2.5 to about 10 parts by weight, based on about 100 parts by weight of the base resin. In some embodiments, the electrically conductive polyamide/polyphenylene ether resin composition may include the olefin-based polymer in an amount of about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 parts by weight. Further, according to some embodiments of the present invention, the olefin-based polymer may be present in an amount of from about any of the foregoing amounts to about any other of the foregoing amounts.

When the olefin-based polymer is present in an amount within the above range, carbon fibrils can be easily moved from the domain to the matrix in the electrically conductive polyamide/polyphenylene ether resin composition, and the electrically conductive polyamide/polyphenylene ether resin composition can exhibit good electrical conductivity.

(C) Impact Modifier

The impact modifier according to exemplary embodiments can serve to improve impact resistance of the electrically conductive polyamide/polyphenylene ether resin composition and may include a styrene elastomer, and the like.

In exemplary embodiments, the styrene elastomer may include at least one of a block copolymer composed of an aromatic vinyl compound and a conjugated diene compound; a hydrogenated block copolymer obtained by hydrogenation of the block copolymer composed of the aromatic vinyl compound and the conjugated diene compound; a modified block copolymer obtained by modification of the block copolymer with a compound selected from the group consisting of α,β-unsaturated dicarboxylic acids and/or α,β-unsaturated dicarboxylic acid derivatives; a modified hydrogenated block copolymer obtained by modification of the hydrogenated block copolymer with a compound selected from among α,β-unsaturated dicarboxylic acids and/or α,β-unsaturated dicarboxylic acid derivatives; and the like, and combinations thereof.

Examples of the aromatic vinyl compound may include without limitation styrene, p-methylstyrene, α-methylstyrene, bromostyrene, chlorostyrene, and the like, and combinations thereof. For example, styrene, α-methylstyrene, and/or a combination thereof may be used as the aromatic vinyl compound.

In exemplary embodiments, the styrene elastomer is derived from the aromatic vinyl compound, and may include not only linear structures including diblock (A-B block), triblock (A-B-A block), tetrablock (A-B-A-B block) and pentablock (A-B-A-B-A block) structures, but also linear structures containing a total of six A and B blocks or more.

Examples of the styrene elastomer may include without limitation a styrene-ethylene-butylene-styrene copolymer, a styrene-butadiene-styrene copolymer, a styrene-ethylene-propylene-styrene copolymer, a styrene-isoprene-styrene copolymer, a styrene-ethylene copolymer, a styrene-ethylene-butadiene-styrene copolymer, a modified styrene-ethylene-butylene-styrene copolymer, a modified styrene-butadiene-styrene copolymer, a modified styrene-ethylene-propylene-styrene copolymer, a modified styrene-isoprene-styrene copolymer, a modified styrene-ethylene copolymer, and a modified styrene-ethylene-butadiene-styrene copolymer, which are obtained by modification of the above compounds with at least one compound selected from the group consisting of α,β-unsaturated dicarboxylic acids and/or α,β-unsaturated dicarboxylic acid derivatives. These may be used alone or as a mixture thereof.

In exemplary embodiments, the electrically conductive polyamide/polyphenylene ether resin composition may include the impact modifier in an amount of about 1 to about 15 parts by weight, for example, about 2.5 to about 10 parts by weight, based on about 100 parts by weight of the base resin. In some embodiments, the electrically conductive polyamide/polyphenylene ether resin composition may include the impact modifier in an amount of about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 parts by weight. Further, according to some embodiments of the present invention, the impact modifier may be present in an amount of from about any of the foregoing amounts to about any other of the foregoing amounts.

When the impact modifier is present in an amount within the above range, the electrically conductive polyamide/polyphenylene ether resin composition can exhibit good impact resistance.

(D) Compatibilizer

The compatibilizer according to exemplary embodiments may be a compound containing two types of functional groups, a compound capable of being modified by the compound containing two types of functional groups, and the like, and combinations thereof. One of the functional groups may be a carbon-carbon double bond or a carbon-carbon triple bond, and the other may be a carboxyl group, an acid anhydride, an epoxy group, an imide group, an amide group, an ester group, an acid chloride, or a functional equivalent thereof.

Examples of the compatibilizer may include without limitation unsaturated dicarboxylic acids such as maleic acid and/or fumaric acid, maleic anhydride, maleic hydrazide, dichloro maleic anhydride, citric acid, citric acid anhydride, malic acid, agaric acid, and the like, and combinations thereof.

In exemplary embodiments, the compatibilizer or a modified compound of the compatibilizer can generate a polyphenylene ether/polyamide block copolymer through reaction with the polyphenylene ether and the polyamide. The block copolymer is distributed at an interface between two components (the polyamide and the polyphenylene ether) in the polyamide/polyphenylene ether resin composition to stabilize morphology of the resin composition. Particularly, in the morphology of the polyamide/polyphenylene ether resin composition in which the polyphenylene ether forms domains (dispersed phases) and the polyamide forms the matrix (continuous phase), it appears that the block copolymer provides an important role in regulating the particle diameters of the domains to about 1 µm, at which effective impact resistance can be obtained (Polymer Engineering and Science, 1990, vol. 30, No. 17, p. 1056-1062).

In exemplary embodiments, the electrically conductive polyamide/polyphenylene ether resin composition may include the compatibilizer in an amount of about 0.2 to about 10 parts by weight, for example, about 0.3 to about 9 parts by weight, based on about 100 parts by weight of the base resin. In some embodiments, the electrically conductive polyamide/polyphenylene ether resin composition may include the compatibilizer in an amount of about 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the compatibilizer may be present in an amount of from about any of the foregoing amounts to about any other of the foregoing amounts.

When the compatibilizer is present in an amount within the above range, the electrically conductive polyamide/polyphenylene ether resin composition can exhibit good properties in terms of compatibility, impact resistance, and the like.

(E) Carbon Fibrils

The carbon fibrils according to exemplary embodiments can be a fiber shaped carbon material comprising 90 wt % or more of carbon. For example, the carbon fibrils may be carbon nanotubes. The carbon nanotubes have great aspect ratio and specific surface area, exhibit excellent properties in terms of mechanical properties, electrical properties, and thermal properties, and thus can be effective materials for engineering plastics. The carbon nanotubes can be classified into single-wall, double-wall and multi-wall carbon nanotubes according to the number of walls, or otherwise can be classified into a zigzag structure, an armchair structure, and a chiral structure according to an angle at which a graphene plane is wrapped. However, it should be understood that various kinds of carbon nanotubes may be used without being limited to the kind and structure of the carbon nanotubes. In exemplary embodiments, multi-wall carbon nanotubes may be used.

In exemplary embodiments, the carbon nanotubes may have a diameter of about 0.5 nm to about 100 nm, for example, about 1 nm to about 10 nm, and a length of about 0.01 µm to about 100 µm, for example, about 0.5 µm to about 10 µm. With the carbon nanotubes within this size range, the electrically conductive polyamide/polyphenylene ether resin composition can exhibit good properties in terms of electrical conductivity, processability, and the like.

The carbon nanotubes may have an aspect ratio (L/D) of about 100 to about 1,000 in terms of improvement in electrical conductivity of the polyamide/polyphenylene ether resin composition.

In exemplary embodiments, in preparation of the electrically conductive polyamide/polyphenylene ether resin composition, the carbon fibrils may be dispersed both in the domains and in the matrix such that the amount of the carbon nanotubes dispersed in the matrix is greater than the amount of the carbon fibrils dispersed in the domains. Then, in the course of melt kneading the composition components, the carbon fibrils are moved from the domains to the matrix due to the presence of the olefin-based polymer, for example, all of the carbon fibrils present in the domains are moved to the matrix containing the polyamide in order to optimize improvement in electrical conductivity of the electrically conductive polyamide/polyphenylene ether resin composition. If the amount of the carbon nanotubes dispersed in the domains is greater than the amount of the carbon fibrils dispersed in the matrix, there can be a problem of significant deterioration in electrical conductivity.

In exemplary embodiments, the carbon fibrils may have a pH of about 4 to about 8, for example, about 4.5 to about 7.5. Typical carbon fibrils have a pH of about 9 and form a reaction product with the compatibilizer such as maleic anhydride or citric anhydride due to such a high pH, thereby deteriorating functions of the compatibilizer and obstructing compatibilization of the polyphenylene ether and the polyamide. According to the present invention, pH of the carbon fibrils may be adjusted within the above range, thereby overcoming the problem of deterioration in compatibility between the polyamide and the polyphenylene ether due to the carbon fibrils while significantly improving electrical conductivity. The carbon fibrils having a pH of about 4 to about 8 can be obtained by neutralization or acidification of the carbon fibrils.

In exemplary embodiments, the carbon fibrils may include about 0.1 to about 5 wt % of an aromatic compound having a molecular weight of about 120 g/mol to about 1,000 g/mol based on 100 wt % of the carbon fibrils. The aromatic compound can be a byproduct generated in preparation of the carbon fibrils and can improve electrical conductivity of the resin composition. The amount of the aromatic compound can be controlled by adjusting conditions for post-treatment of the carbon fibrils, for example, by adjusting heat treatment temperature and time of the carbon fibrils. For example, the carbon fibrils may be subjected to heat treatment at about 950° C. to about 1,050° C. while adjusting heat treatment time such that the aromatic compound may be present in an amount of about 0.1 wt % to about 5 wt % based on 100 wt % of the carbon fibrils. Within this content range of the aromatic compound, the electrically conductive polyamide/polyphenylene ether resin composition including the carbon fibrils can exhibit further improved electrical conductivity.

In exemplary embodiments, the carbon fibrils may be prepared by bringing a metal catalyst into contact with a carbon-containing gas in a reactor under reaction conditions including a particular temperature. The temperature may range from about 400° C. to about 850° C., for example, about 600° C. to about 750° C. For example, the carbon fibrils may be continuously produced by adding a metal particulate catalyst to a reactor at a reaction temperature within the above range such that the catalyst particulates continuously contact the carbon-containing gas.

Examples of the carbon-containing gas may include aliphatic hydrocarbons such as ethylene, propylene, propane, and methane; carbon monoxide; aromatic hydrocarbons such as benzene, naphthalene, and toluene; and/or oxidized hydrocarbons.

In exemplary embodiments, the catalyst may be prepared using a non-aqueous solvent, and may contain iron and at least one of Group V elements (vanadium and the like), Group VI elements (molybdenum, tungsten, chromium, and the like), Group VII elements (manganese and the like), and lanthanoids (cerium and the like). Advantageously, the non-aqueous solvent exhibits good reproducibility and does not require careful adjustment of pH and thermal history of the catalyst. In exemplary embodiments, a metal particulate catalyst attached to a support, for example, alumina, can be used.

In preparation of the carbon fibrils by the method as described above, the aromatic compound is also produced as a by-product. Such an aromatic compound is not separately added as one component of the polyamide/polyphenylene ether resin composition, but is a material subordinately produced in the course of preparing the carbon fibrils. The content of the aromatic compound may be measured by extracting the aromatic compound from the carbon fibrils using an organic solvent.

In exemplary embodiments, the electrically conductive polyamide/polyphenylene ether resin composition may include the carbon fibrils in an amount of about 0.1 to about 5 parts by weight, for example, about 0.5 to about 3 parts by weight, based on about 100 parts by weight of the base resin. In some embodiments, the electrically conductive polyamide/polyphenylene ether resin composition may include the carbon fibrils in an amount of about 0.1, 0.2, 0.3, 0.4, 0.5, 0.6, 0.7, 0.8, 0.9, 1, 2, 3, 4, or 5 parts by weight. Further, according to some embodiments of the present invention, the carbon fibrils may be present in an amount of from about any of the foregoing amounts to about any other of the foregoing amounts.

When the carbon fibrils are present in an amount within the above range, the electrically conductive polyamide/polyphenylene ether resin composition can exhibit good properties in terms of electrical conductivity, compatibility, and the like.

The electrically conductive polyamide/polyphenylene ether resin composition according to exemplary embodiments may further include one or more additives, such as but not limited to a flame retardant, a lubricant, a plasticizer, a heat stabilizer, an antioxidant, a photostabilizer, a colorant, inorganic fillers, and the like, and combinations thereof.

In exemplary embodiments, the flame retardant is a material for reducing to flammability and may include at least one selected from the group consisting of a phosphate compound, a phosphite compound, a phosphonate compound, a polysiloxane compound, a phosphazene compound, a phosphinate compound, a melamine compound, and combinations thereof, without being limited thereto.

In exemplary embodiments, the lubricant is a material capable of assisting in flow and/or movement of the resin composition by lubricating a metal surface contacting the electrically conductive polyamide/polyphenylene ether resin composition during machining, molding and/or extrusion, and may be selected from any typical lubricants used in the art.

In exemplary embodiments, the plasticizer is a material capable of improving flexibility, machining workability and/or expansion of the electrically conductive polyamide/polyphenylene ether resin composition and may be selected from any typical plasticizers used in the art.

In exemplary embodiments, the heat stabilizer is a material capable of suppressing thermal decomposition of the resin composition upon kneading and/or molding the electrically conductive polyamide/polyphenylene ether resin composition at high temperature, and may be selected from any typical heat stabilizers used in the art.

In exemplary embodiments, the antioxidant is a material capable of preventing the resin composition from being decomposed and losing inherent properties by suppressing and/or preventing chemical reaction of the electrically conductive polyamide/polyphenylene ether resin composition with oxygen, and may include at least one of phenol, phosphite, thioether and amine antioxidants, without being limited thereto.

In exemplary embodiments, the photostabilizer is a material capable of suppressing and/or preventing color change and/or loss of mechanical properties of the electrically conductive polyamide/polyphenylene ether resin composition due to decomposition of the resin composition, and may include, for example, titanium oxide.

Examples of the colorant may include dyes and/or pigments.

In exemplary embodiments, the additives may be present in an amount of about 0.1 to about 10 parts by weight based on about 100 parts by weight of the base resin, without being limited thereto. Within this content range of the additives, the electrically conductive polyamide/polyphenylene ether resin composition can improve desired properties with minimal or no deterioration in mechanical properties and/or external appearance.

As described above, the electrically conductive polyamide/polyphenylene ether resin composition according to the present invention may be composed of domains and a matrix phase, wherein the domains may include the polyphenylene ether (A-1) and the impact modifier (C), and the matrix may include the polyamide (A-2), the olefin-based polymer (B) and the carbon fibrils (E).

In exemplary embodiments, the domains may include about 90 vol % or more, for example about 93 vol % to about 99 vol %, and as another example about 96 vol % to about 98 vol %, based on 100 vol % of overall domains of domain particles having a particle diameter of about 0.1 μm to about 2.0 μm, for example, about 0.3 μm to about 1.0 μm. If the particle diameter of the domain particles exceeds about 2.0 μm, the resin composition can be formed in a state that compatibilization of the polyamide and the polyphenylene ether is insufficient, which can deteriorate mechanical strength, impact resistance and/or electrical conductivity of the electrically conductive polyamide/polyphenylene ether resin composition. If the diameter of the domain particles is less than about 0.1 μm, there can be a problem of deterioration in flowability of the electrically conductive polyamide/polyphenylene ether resin composition and in appearance characteristics in manufacture of a molded article using the resin composition.

In exemplary embodiments, the electrically conductive polyamide/polyphenylene ether resin composition may have a surface resistance of about $10^8 \Omega/\square$ or less, for example, about $10 \Omega/\square$ to about $10^7 \Omega/\square$, and as another example about $10^2\Omega/\square$ to about $10^5\Omega/\square$, as measured on a specimen having a size of about 100 mm×about 100 mm×about 0.5 mm under conditions of about 23° C. and about 50% RH. Within this range of surface resistance, the electrically conductive polyamide/polyphenylene ether resin composition can exhibit good electrical conductivity.

The electrically conductive polyamide/polyphenylene ether resin composition according to exemplary embodiments may be prepared using an electrically conductive master batch.

In exemplary embodiments, the electrically conductive polyamide/polyphenylene ether resin composition may be prepared by melt kneading a portion or the entirety of the polyamide (A-2) and a portion or the entirety of the carbon fibrils (E) with a portion or the entirety of at least one of the olefin-based polymer (B) and/or the impact modifier (C) to form an electrically conductive master batch, followed by adding and melt kneading remaining components (the polyphenylene ether (A-1), a remaining portion of the polyamide (A-2), a remaining portion of the carbon fibrils (E), remaining portions of the olefin-based polymer (B) and/or the impact modifier (C), and the compatibilizer (D)) not included in the electrically conductive master batch.

In preparation of the electrically conductive master batch, the olefin-based polymer is added to increase viscosity of the molten mixture in melt kneading and dispersion of the carbon fibrils, thereby improving electrical characteristics of the master batch. The electrically conductive master batch may have a smooth surface and a soft shape, whereby strands produced upon extrusion of the electrically conductive master batch can be easily cut, thereby improving productivity.

A molded article according to the present invention may be produced from the electrically conductive polyamide/polyphenylene ether resin composition. For example, various articles (products) may be produced by various molding methods, such as injection molding, extrusion molding, vacuum molding, and casting, using the electrically conductive polyamide/polyphenylene ether resin composition. Such a molding method is well known to a person having ordinary knowledge in the art. The electrically conductive polyamide/polyphenylene ether resin composition can exhibit good properties in terms of mechanical strength, heat resistance, impact resistance, electrical conductivity, and the like, and thus can be applied to molded articles (components) for vehicles, such as automotive tail gates, automotive fuel doors, automotive fenders, and door panels, without being limited thereto.

Next, the present invention will be described in more detail with reference to the following examples. It should be understood that these examples are provided for illustration only and are not to be construed in any way as limiting the present invention.

EXAMPLES

Details of components used in the Preparative Examples, Examples and Comparative Examples are as follows.
(a) Base Resin
(a-1) Poly(2,6-dimethyl-1,4-phenylene) ether (Noryl PPO 646, Sabic Innovative Plastics Co., Ltd.) is used
(a-2) Polyamide 66 (STABAMID 24 AE 1, Rhodia Co., Ltd.) is used
(b) Olefin-Based Polymer
(b-1) A maleic anhydride modified ethylene-propylene copolymer is used
(b-2) A maleic anhydride modified low density polyethylene is used.
(c) Impact Modifier
A styrene-ethylene-butylene-styrene copolymer (SEBS) (Kraton G 1651, Kraton Polymers Co., Ltd.) is used
(d) Compatibilizer
Maleic anhydride (Sigma-Aldrich GmbH) is used.
(e) Carbon Fibrils
Nanocyl NC 7000 (Nanocyl Co., Ltd.) is used.

Preparative Examples 1 to 5: Preparation of Master Batch

According to contents (amounts) of components as listed in Table 1, components listed in main feeding of Table 1 are mixed in a dry state and continuously fed in a quantitative manner into a main feeding port of a twin-screw extruder (TEX-40, JSW Co., Ltd.), and components listed in side feeding of Table 1 are continuously fed in a quantitative manner into a side feeding port of the twin-screw extruder, followed by melt kneading. Here, the total amount of the polyamide (A-2) and the olefin-based polymer (b) or the impact modifier (c) is 100 wt %, and the amount of carbon fibrils (e) is indicated in parts by weight. In addition, the side feeding port means an inlet port placed near a die of the extruder and the extruder is operated at a screw rotation speed of 400 rpm. Next, molten strands ejected from the die of the extruder are cooled in a cooling water bath to obtain solidified strands, which in turn are cut into pellets, thereby providing a master batch in pellet form. Electrically conductive master batches of Preparative Examples 1 to 4 fall within the scope of the present invention, and an electrically conductive master batch of Preparative Example 5 is prepared by adding the polyamide and the carbon fibrils. The prepared master batches are evaluated as to surface roughness Ra of strands and productivity, and evaluation results are shown in Table 1. Surface roughness Ra of strands is measured using a morphology measurement laser microscope (VK-X200, Keyence Co., Ltd.) in accordance with JIS B-0601. As used herein, productivity (production rate) means a maximum production amount (rate) which can be stably achieved in each of Preparative Examples.

TABLE 1

| | Components | Preparative Example 1 M/B 1 | Preparative Example 2 M/B 2 | Preparative Example 3 M/B 3 | Preparative Example 4 M/B 4 | Preparative Example 5 M/B 5 |
|---|---|---|---|---|---|---|
| Main feeding | (a-2) | 50 | 50 | 50 | — | 100 |
| | (b-1) | — | 50 | — | 50 | — |
| | (b-2) | — | — | 50 | — | — |
| | (c) | 50 | — | — | — | — |
| | (e) | 10 | 10 | 10 | — | 10 |

TABLE 1-continued

|  | Components | Preparative Example 1 M/B 1 | Preparative Example 2 M/B 2 | Preparative Example 3 M/B 3 | Preparative Example 4 M/B 4 | Preparative Example 5 M/B 5 |
|---|---|---|---|---|---|---|
| Side feeding | (a-2) | — | — | — | 50 | — |
|  | (e) | — | — | — | 10 | — |
| Surface roughness (μm) |  | 0.24 | 0.26 | 0.25 | 0.56 | 0.83 |
| Production amount (kg/hr) |  | 150 | 180 | 150 | 200 | 70 |

From the result shown in Table 1, it can be seen that each of the electrically conductive master batches prepared in Preparative Examples 1 to 4 has a relatively smooth uniform surface of strands and secures a high production amount per hour. Unlike the electrically conductive master batch of Preparative Example 5, it can be observed that the extruded strands of the electrically conductive master batches of Preparative Examples 1 to 4 include the olefin-based polymer or the impact modifier and have a soft smooth surface. Such strands of the electrically conductive master batches can be stably produced to provide good productivity, instead of being shaken in the cooling bath, and cab be easily pelletized through cutting.

Conversely, the extruded strands of the electrically conductive master batch of Preparative Example 5 have a hard rough surface, are broken or agglomerated due to shaking in the cooling bath, and are not smoothly cut, providing very low productivity.

Namely, it can be seen that the productivity of the electrically conductive master batch can be improved by further adding the olefin-based polymer or the impact modifier, which can act as an elastomer, instead of simply mixing the polyamide and the carbon fibrils.

Examples 1 to 4 and Comparative Examples 1 to 3: Preparation of Electrically Conductive Polyamide/Polyphenylene Ether Resin Composition According to contents (amounts) of components as listed in Table 2, components listed in main feeding of Table 1 are mixed in a dry state and continuously fed in a quantitative manner into a main feeding port of a twin-screw extruder (TEX-40, JSW Co., Ltd.), and components listed in side feeding of Table 1 are continuously fed in a quantitative manner into a side feeding port of the twin-screw extruder, followed by melt kneading. In Table 2, MB 1 to MB 5 refer to the electrically conductive master batches prepared in Preparative Examples 1 to 5, respectively, and the amount of each component is indicated in parts by weight. The extruder is operated at a screw rotation speed of 400 rpm and the overall production rate is about 100 kg per hour. Then, electrically conductive polyamide/polyphenylene ether resin compositions are prepared in pellet form through the extruder. The prepared polyamide/polyphenylene ether resin compositions are evaluated as to flexural modulus, heat deflection temperature, dart falling impact strength, surface resistance, and particle diameters of domains (dispersed phases), and volume percentage of domains having a particle diameter of 0.1 to 2.0 μm with respect to all domains by the following methods, and results are shown in Table 2.

Property Evaluation (1) Flexural Modulus (Unit: GPa)

The prepared pellets are injection molded into specimens for measurement of flexural modulus using an injection molding machine (SELEX-TX150, Woojin Selex Co., Ltd.) at a cylinder temperature of 280° C. and a mold temperature of 80° C., and flexural modulus of each of the specimens is measured in accordance with ISO 527.

(2) Heat Deflection Temperature (HDT, Unit: ° C.)

The prepared pellets are injection molded into specimens for measurement of heat deflection temperature using an injection molding machine (SELEX-TX150, Woojin Selex Co., Ltd.) at a cylinder temperature of 280° C. and a mold temperature of 80° C., and heat deflection temperature of each of the specimens is measured under a load of 0.45 MPa in accordance with ISO 75-2.

(3) Dart Falling Impact Strength (Unit: J)

The prepared pellets are injection molded into specimens having a size of 100 mm×100 mm×3 mm (20 specimens for each of the prepared resin compositions) for measurement of dart falling impact strength using an injection molding machine (SELEX-TX150, Woojin Selex Co., Ltd.) under conditions of a cylinder temperature of 280° C. and a mold temperature of 80° C. The molded specimens are left under conditions of about 23° C. and about 50% RH for about 6 hours, and are measured as to total energy (J) of dart falling impact strength using a dart falling impact strength tester (Fractovis Plus, CEAST Co., Ltd.) under conditions of about 23° C. and about 50% RH in accordance with ASTM D3763. Specifically, a head dart having a diameter of 12.7 mm and adjusted to a weight of 1 kg to 10 kg according to impact strength of each of the electrically conductive polyamide/polyphenylene ether resin compositions is dropped onto each of the specimens from a height of 1 m and fracture energy of the specimen is obtained using a measurement instrument connected to the dart falling impact strength tester. An average value of fracture energy values obtained by repeating this measurement 20 times with respect to each of the specimens is determined as dart falling impact strength of each of the resin compositions.

(4) Surface Resistance (Unit: Ω/□)

Specimens for measurement of surface resistance are prepared through thermal compression molding. 6 g of pellets prepared from each of the electrically conductive polyamide/polyphenylene ether resin compositions of Examples 1 to 4 and Comparative Examples 1 to 3 is placed in a mold having a cavity of 100 mm×100 mm×0.5 mm, which in turn is placed between a pair of metal plates and inserted into a heat compression molding machine set to 300° C. After application of a pressure of 50 kgf/cm$^2$ to the mold and the metal plates for 3 minutes, the mold and the metal plates are removed from the heat compression molding machine and inserted into a cooling compression molding machine set to 25° C. After application of a pressure of 50 kgf/cm$^2$ to the mold and the metal plates for 2 minutes, the mold and the metal plates are removed from the cooling compression molding machine. Then, a molded specimen having a size of 100 mm×100 mm×0.5 mm is removed from the mold and the pair of metal plates. The molded specimen is left under conditions of about 23° C. and about 50% RH for about 6 hours. Next, surface resistance of the specimen is measured under conditions of 23° C. and 50% RH using a resistance measurement system (Hiresta-UP MCP-HT450) provided with a probe (MCP-HTP14, Mitsubishi Chemical Analytech). Surface resistance is measured at a voltage of 250 V for 30 seconds.

(5) Volume Average Diameter of Domain Particles (Dv) and Volume Percentage (Vol %) of Domain Particles Having a Diameter of 0.1 µm to 2.0 µm (Vm % d=0.1-2 µm)

1 µm thick specimens are prepared using the electrically conductive polyamide/polyphenylene ether resin compositions prepared in Examples 1 to 4 and Comparative Examples 1 to 3, and photographed using a transmittance electron microscope (magnification: 4,000×) to measure particle diameters of domain particles. An average value of a major axis length and a minor axis length of the domain particle is defined as the diameter of the domain particle, and particle diameters of 500 or more of domain particles are measured. Specifically, the volume average diameter of domain particles is calculated according to Equation 1, and vol % of domain particles having a diameter of 0.1 µm to 2.0 µm is calculated according to Equation 2.

$$D_v = \sum_{d_i=0}^{\infty} \frac{d_i^4 \cdot n_{d_i}}{d_i^3 \cdot n_{di}}$$ [Equation 1]

$$Vm\ \%_{d:0,1-2\ \mu m} = \frac{\sum_{d_i=0,1}^{2} d_i^3 \cdot n_{d_i}}{\sum_{d_i=0}^{\infty} d_i^3 \cdot n_{d_i}}$$ [Equation 2]

parative Example 3, which is prepared without using the electrically conductive master batch, exhibits poor properties in terms of mechanical strength, heat resistance, impact resistance and electrical conductivity.

The electrically conductive polyamide/polyphenylene ether resin compositions prepared in Comparative Examples 1 to 3 have much larger domain particles than the resin compositions of Examples, and have less than 80 vol % of domain particles having a particle size of 0.1 µm to 2.0 µm with respect to total domain particles.

That is, it can be seen that, in preparation of the polyamide/polyphenylene ether resin composition using the electrically conductive master batch including the olefin-based polymer or the impact modifier, the domain particles can be adjusted to have a small particle diameter, thereby securing good properties.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:
1. An electrically conductive polyamide/polyphenylene ether resin composition comprising:
  a polyphenylene ether;
  a polyamide;

TABLE 2

| | | Example | | | | Comparative Example | | |
|---|---|---|---|---|---|---|---|---|
| Component | | 1 | 2 | 3 | 4 | 1 | 2 | 3 |
| Main feeding | (a-1) | 37 | 37 | 37 | 37 | 37 | 37 | 37 |
| | (b-1) | — | — | — | — | 5 | — | — |
| | (b-2) | 5 | — | — | — | — | 5 | 5 |
| | (c) | 1 | 6 | 6 | 6 | 6 | 6 | 6 |
| | (d) | 0.3 | 0.3 | 0.3 | 0.3 | 0.3 | 0.3 | 0.3 |
| | (e) | — | — | — | — | — | — | 1 |
| | (M/B 1) | 11 | — | — | — | — | — | — |
| | (M/B 2) | — | 11 | — | — | — | — | — |
| | (M/B 3) | — | — | 11 | — | — | — | — |
| | (M/B 4) | — | — | — | 11 | — | — | — |
| | (M/B 5) | — | — | — | — | 11 | 11 | — |
| Side feeding | (a-2) | 58 | 58 | 58 | 58 | 53 | 53 | 63 |
| Flexural modulus (GPa) | | 2.1 | 2.1 | 2.1 | 2.0 | 2.0 | 2.1 | 1.9 |
| Heat deflection temperature (° C.) | | 198 | 198 | 197 | 198 | 198 | 197 | 196 |
| Dart falling impact strength (J) | | 40 | 39 | 42 | 36 | 36 | 29 | 21 |
| Surface resistance (Ω/□) | | $10^{4.8}$ | $10^{4.5}$ | $10^{4.6}$ | $10^{8.8}$ | $10^{6.8}$ | $10^{8.5}$ | $10^{9.6}$ |
| Dv (µm) | | 0.97 | 0.83 | 0.92 | 0.89 | 1.23 | 1.37 | 1.43 |
| Vm % d = 0.1-2 µm (vol %) | | 98 | 97 | 96 | 97 | 78 | 70 | 65 |

From the results, it can be seen that the electrically conductive polyamide/polyphenylene ether resin compositions according to the present invention (Examples 1 to 4) have good properties in terms of mechanical strength, heat resistance, impact resistance and electrical conductivity.

Conversely, it can be seen that the electrically conductive polyamide/polyphenylene ether resin compositions of Comparative Examples 1 and 2, which are prepared using the electrically conductive master batch (Preparative Example 5) obtained by mixing only the polyamide and the carbon fibrils, have worse electrical conductivity than the resin compositions of Examples 1 to 4.

In addition, it can be seen that the electrically conductive polyamide/polyphenylene ether resin composition of Coman olefin-based polymer comprising a maleic anhydride modified ethylene-propylene copolymer and/or a maleic anhydride modified low density polyethylene;
an impact modifier comprising a styrene-ethylene-butylene-styrene copolymer;
a compatibilizer comprising maleic anhydride; and
carbon fibrils,
wherein the polyphenylene ether and the impact modifier form domains, and the polyamide, the olefin-based polymer and the carbon fibrils form a matrix, the domains comprising about 90 vol % or more of domain particles having a particle diameter of 0.1 µm to 2.0 µm, and wherein the electrically conductive polyamide/polyphenylene ether resin composition has a surface resistance of about $10^8$ Ω/square or less as measured on a specimen having a size of about 100 mm×about 100 mm×about 0.5 mm under conditions of about 23° C. and about 50% relative humidity (RH), wherein the electrically conductive polyamide/polyphenylene ether resin composition is prepared by melt kneading a portion or the entirety of the polyamide and a portion or the entirety of the carbon fibrils with a portion or the entirety of at least one of the olefin-based polymer and the impact modifier to form an electrically conductive master batch, adding remaining components not included in the electrically conductive master batch, and melt kneading, wherein the electrically conductive polyamide/polyphenylene ether resin composition comprises about 100 parts by weight of a base resin comprising about 10 wt % to about 65 wt % of the polyphenylene ether and about 35 wt % to about 90 wt % of the polyamide; about 1 to about 15 parts by weight of the olefin-based polymer; about 1 to about 15 parts by weight of the impact modifier; about 0.2 to about 10 parts by weight of the compatibilizer; and about 0.1 to about 5 parts by weight of the carbon fibrils.

2. The electrically conductive polyamide/polyphenylene ether resin composition according to claim 1, wherein the polyphenylene ether comprises at least one of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, a copolymer of poly(2,6-dimethyl-1,4-phenylene) ether and poly(2,3,6-trimethyl-1,4-phenylene) ether, and a copolymer of poly(2,6-dimethyl-1,4-phenylene) ether and poly(2,3,6-triethyl-1,4-phenylene) ether.

3. The electrically conductive polyamide/polyphenylene ether resin composition according to claim 1, wherein the polyamide comprises at least one of Polyamide 6, Polyamide 66, Polyamide 46, Polyamide 11, Polyamide 12, Polyamide 610, Polyamide 612, Polyamide 6/66, Polyamide 6/612, Polyamide MXD6, Polyamide 6/MXD6, Polyamide 66/MXD6, Polyamide 6T, Polyamide 6I, Polyamide 6/6T, Polyamide 6/6I, Polyamide 66/6T, Polyamide 66/6I, Polyamide 6/6T/6I, Polyamide 66/6T/6I, Polyamide 9T, Polyamide 9I, Polyamide 6/9T, Polyamide 6/9I, Polyamide 66/9T, Polyamide 6/12/9T, Polyamide 66/12/9T, Polyamide 6/12/9I, and Polyamide 66/12/6I.

4. The electrically conductive polyamide/polyphenylene ether resin composition according to claim 1, wherein the impact modifier further comprises at least one of a block copolymer composed of an aromatic vinyl compound and a conjugated diene compound, a hydrogenated block copolymer obtained by hydrogenation of the block copolymer composed of the aromatic vinyl compound and the conjugated diene compound, a modified block copolymer obtained by modification of the block copolymer with at least one compound of α,β-unsaturated dicarboxylic acids and α,β-unsaturated dicarboxylic acid derivatives, and a modified hydrogenated block copolymer obtained by modification of the hydrogenated block copolymer with at least one compound of α,β-unsaturated dicarboxylic acids and α,β-unsaturated dicarboxylic acid derivatives.

5. The electrically conductive polyamide/polyphenylene ether resin composition according to claim 1, wherein the compatibilizer further comprises at least one of maleic acid, maleic hydrazide, dichloro maleic anhydride, fumaric acid, citric acid, citric acid anhydride, malic acid and agaric acid.

6. The electrically conductive polyamide/polyphenylene ether resin composition according to claim 1, wherein the carbon fibrils have a pH of about 4 to about 8.

7. The electrically conductive polyamide/polyphenylene ether resin composition according to claim 1, wherein the carbon fibrils comprise about 0.1 wt % to about 5 wt % of an aromatic compound having a molecular weight of about 120 g/mol to about 1,000 g/mol.

8. The electrically conductive polyamide/polyphenylene ether resin composition according to claim 1, wherein the domains comprise about 93 vol % to about 99 vol % of domain particles having a particle diameter of 0.1 µm to 2.0 µm.

9. The electrically conductive polyamide/polyphenylene ether resin composition according to claim 8, wherein the domains comprise about 93 vol % to about 99 vol % of domain particles having a particle diameter of 0.3 µm to 1.0 µm.

10. The electrically conductive polyamide/polyphenylene ether resin composition according to claim 1, wherein the domains comprise about 96 vol % to about 99 vol % of domain particles having a particle diameter of 0.1 µm to 2.0 µm.

11. The electrically conductive polyamide/polyphenylene ether resin composition according to claim 10, wherein the domains comprise about 96 vol % to about 99 vol % of domain particles having a particle diameter of 0.3 µm to 1.0 µm.

12. The electrically conductive polyamide/polyphenylene ether resin composition according to claim 1, wherein the olefin-based polymer is a maleic anhydride modified low density polyethylene.

13. A molded article for vehicles manufactured using the electrically conductive polyamide/polyphenylene ether resin composition according to claim 1.

* * * * *

UNITED STATES PATENT AND TRADEMARK OFFICE
CERTIFICATE OF CORRECTION

Page 1 of 1

PATENT NO. : 10,056,168 B2
APPLICATION NO. : 15/090917
DATED : August 21, 2018
INVENTOR(S) : Choi et al.

It is certified that error appears in the above-identified patent and that said Letters Patent is hereby corrected as shown below:

On the Title Page

Delete Attorney, Agent, or Firm and replace it with: "Additon, Higgins & Pendleton, P.A."

Under Foreign Patent Documents delete "JP M03-528941 9/2003" and replace it with: "JP 2003-528941 9/2003"

In the Specification

Column 2, delete Line 48 and replace it with: "0.1 μm to about 2.0 μm, and wherein the electrically conductive"

Column 5, delete Line 60 and replace it with: "lactam and ω-laurolactam; aliphatic, alicyclic, and/or aro-"

Column 11, delete Line 58 and replace it with: "rial for reducing flammability and may include at least one"

Column 15, delete Line 47 and replace it with: "followed by melt kneading. In Table 2, M/B 1 to M/B 5 refer"

In the Claims

Claim 3, Column 19, delete Line 44 and replace it with: "Polyamide 6/6I, Polyamide 66/6T, Polyamide 66/6I Poly-"

Claim 3, Column 19, delete Line 46 and replace it with: "amide 9I, Polyamide 6/9T, Polyamide 6/9I, Polyamide"

Claim 3, Column 19, delete Line 48 and replace it with: "6/12/9I, and Polyamide 66/12/6I."

Signed and Sealed this
Fourth Day of June, 2019

Andrei Iancu
*Director of the United States Patent and Trademark Office*